United States Patent [19] [11] Patent Number: 4,774,604
Hayashi et al. [45] Date of Patent: Sep. 27, 1988

[54] TAPE LOOSENESS PREVENTIVE DEVICE

[75] Inventors: Hideki Hayashi; Satoshi Takagi; Kikuo Yoshikawa, all of Tokyo, Japan

[73] Assignee: Clarion Co., Ltd., Tokyo, Japan

[21] Appl. No.: 940,777

[22] Filed: Feb. 4, 1987

Related U.S. Application Data

[63] Continuation of Ser. No. 530,762, Sep. 8, 1983, abandoned.

[30] Foreign Application Priority Data

Sep. 10, 1982 [JP] Japan ................. 57-156582

[51] Int. Cl.$^4$ ........................................... G11B 15/18
[52] U.S. Cl. ...................................... 360/71; 360/96.3
[58] Field of Search .................. 360/85, 93, 95, 96.3, 360/96.1, 105, 71, 74.1–74.3; 242/75.51, 75.4, 203

[56] References Cited

U.S. PATENT DOCUMENTS

| 3,934,270 | 1/1976 | Iwata | 360/96.3 |
| 4,030,131 | 6/1977 | Beiter | 242/75.51 X |
| 4,067,051 | 1/1978 | Nakamura | 360/95 |
| 4,149,202 | 4/1979 | Terada | 360/96.3 |
| 4,468,711 | 8/1984 | Schoenmaker | 360/96.3 |
| 4,495,535 | 1/1985 | Kohri | 360/96.3 |

Primary Examiner—A. J. Heinz
Attorney, Agent, or Firm—Russell E. Hattis; Stephen R. Arnold

[57] ABSTRACT

A tape looseness preventive device comprises a tape takeup reel base for rotation in response to insertion of a cassette pack into a tape player, a tape supply reel base, a head getting in pressure contact with a tape in the cassette pack a predetermined time later than the starting of rotation of the takeup reel base, and a braking mechanism locking the tape supply reel base unrotatable before full advancement of the head to the tape travelling path and unlocking the tape supply reel base upon the full advancement of the head.

4 Claims, 1 Drawing Sheet

4,774,604

TAPE LOOSENESS PREVENTIVE DEVICE

This application is a continuation of application Ser. No, 530,762, filed 9/8/83 and now abandoned.

FIELD OF THE INVENTION

This inventon relates to a tape looseness preventive device in a cassette-type tape player, and more particularly to such a device capable of removing looseness of a tape in a cassette pack after the cassette pack is inserted in the tape player and before a head and pinch rollers are brought into pressure contact with the tape to effect the play mode.

BACKGROUND OF THE INVENTION

A cassette-type tape player, in general, is designed so that, upon ejection of a cassette, a head retreats from its normal reproducing position, and pinch rollers come apart from capstans to release their pressure against the tape, in order to clear the way for removal of the tape. Therefore, when a tape pack is anew put in the tape player, simultaneously with power application, a tape takeup reel base starts rotating, the pinch rollers come forcibly into contact with the capstans to transport the tape, and the head fully advances to the position for pressure contact with the tape and picks up recorded signals on the tape. Since these motions are indispensable for the play mode of the tape player, they take place substantially concurrently even though there are small time lags between them.

PROBLEM INVOLVED IN THE PRIOR ART

If the tape is loose when the cassette pack is inserted into the tape player, the following problems will occur:

(1) The loose tape is taken up along the peripheries of the capstans and the pinch rollers and accumulates on them before travelling to the takeup reel. Particularly, since the pinch rollers are made of a nonslip material such as, rubber and the like, they easily take the loose tape thereonto. This causes various failures such as unexpected interruption of the tape player operation, breakage of the tape, for example.

(2) Although the head fully advances to the tape travelling path, it cannot get an adequate pressure contact with the tape because the tape is not stretched to the full. Therefore, reliable and faithful audio output cannot be expected for a relatively long time required before the tape looseness is removed to ensure the reliable reproducing operation.

Since such looseness of a tape in a cassette causes the failures and unreliable operation as mentioned in the above, it is proposed to make a deliberate time lag between the full advancement of the head and the rotation of the reel bases, i.e. to first drive the reel bases to eliminate the looseness of the tape and thereafter bring the head and the pinch rollers into pressure contact with the tape.

However, since the time lag between the full advancement of the head and the start of rotation of the reel bases is fixed irrespective of the condition of the tape, the tape must travel for a determined time before the time lag expires even if the tape is properly stretched or is not so loose, thereby causing a so-called head-cut where signals on the desired starting part of the tape are not reproduced into sound. Therefore, the above-proposed device cannot be employed in a tape player which is expected to effect faithful recording and reproduction.

OBJECT OF THE INVENTION

It is therefore an object of the invention to provide a tape looseness preventive device capable of taking up a loose part of a tape before completion of pressure contact by a head so as to effect the reproduction just from an intended position of the tape when the tape is properly stretched, or to minimize unreproduced length of the tape even when the tape is loose.

SUMMARY OF THE INVENTION

In accordance with the invention, there is provided a tape looseness preventive device in a tape player which comprises:
 a tape takeup reel base;
 a tape supply reel base;
 a head shift means carrying a magnetic head thereon; and
 a brake means for locking said tape supply reel base, said brake means unlocking said tape supply reel base in response to movement of said head shift means to bring said head into pressure contact with a tape in a cassette pack set on said both reel bases.

BRIEF DESCRIPTION OF THE DRAWINGS

The drawings show a tape looseness preventive device embodying the invention wherein.

DETAILED DESCRIPTION OF THE PREFERRED EMBODIMENTS

Figure 1:
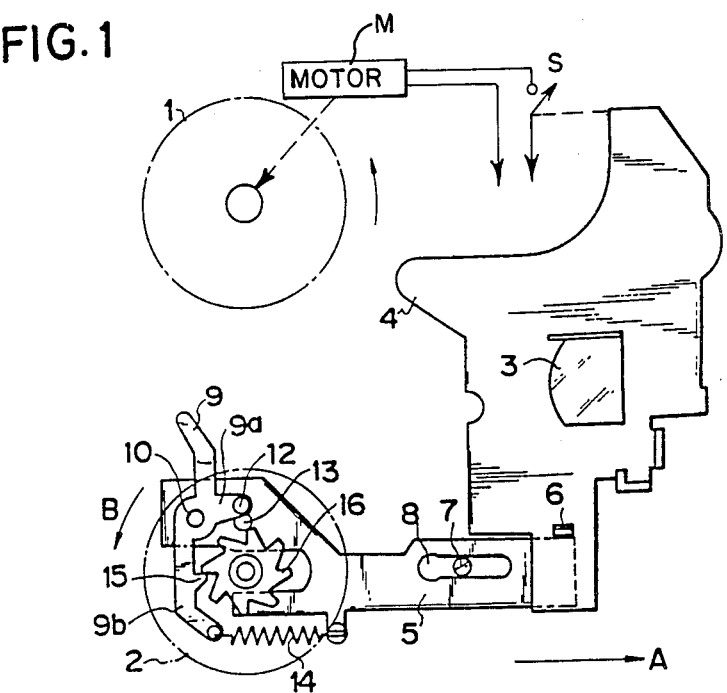
FIG. 1 is a plan view showing the state before the head fully advances to the position for pressure contact with a tape.

The invention will now be described in detail by way of preferred embodiments referring to the drawings.

Construction

In the drawings, reference numeral 1 designates a tape takeup reel base and 2 denotes a tape supply reel base. The takeup reel base 1 is operatively linked to a drive motor not shown as in known tape players and is driven in the takeup direction upon energization of the motor. The tape supply reel base 2 is brought into rotation by a tape which travels toward the takeup reel base 1. Both reel bases 1 and 2 have friction pulleys each frictionally engaging a shaft thereof so as not to directly convey a torque from the motor to the tape and not to produce a looseness of the tape due to excessive rotation of the supply reel base 2.

A head 3 is carried by a head plate 4 which is monted on the base plate of the tape player for a right-angle movement relative to the tape travelling path. The head plate 4 may be driven by any known means such as a spring or a cam responsive to insertion of a tape pack into the tape player. However, this embodiment employs a mechanism to shift the head plate 4 toward a tape a given time later than energization of the motor, by conveying the motor force to the head plate 4 via a cam or a rack gear combined with a clutch mechanism (this type of head shift mechanism is well known and the present invention employs it, too). More specifically, when the head plate 4 is displaced by the motor force, a time corresponding to the movement stroke of the head plate 4 is required from the start of rotation of the motor to the full advancement of the head 3. This time makes the time lag between the start of rotation of the takeup reel base 1 disposed for concurrent rotation with the motor and the full advancement of the head 3. It is also possible to energize the motor when a tape pack reaches the entrance of the tape player and thereafter effect the advancement of the head plate 4 by use of mechanical means such as a cam and a spring just when the tape pack is fully inserted into the tape player.

To the head plate 4 which advances a given time later than the start of rotation of the takeup reel base 1, a braking mechanism for the supply reel base 2 is connected.

The braking mechanism comprises a slide plate 5 extending from the head plate 4 toward the supply reel base 2. The slide plate 5 has an engagement projection 6 formed at one end thereof which engages the head plate 4. The slide plate 5 is movable toward and away from the supply reel base 2 along with the head plate 4. A guide pin 7 secured to the base plate of the tape player is slidably inserted in a guide hole 8 formed in the slide plate 5 to guide the movement of the slide plate 5.

The other end of the slide plate 5 branches into two parts so as to capture the axle of the supply reel base 2 between the two branches. A pivotal link 9 is mounted on one of the branches pivotally about an axle 10. The pivotal link has three arms which extend substantially radially from the center thereof engaging the axle 10. One of the arms designated by 9a and extending toward the head plate 4 has a pin 12 secured to the tip thereof for engagement with an angular displacement control hole 13 formed in the slide plate 5. Another arm 9b is elongated so as to encircle the axle of the supply reel base 2 from the opposite side to the slide plate 5. A spring 14 is connected between the tip of the arm 9b and the slide plate 5 to pull the pivotal link 9 toward the axle of the supply reel base 2. The arm 9b further has a stopper 15 projecting toward the axle of the tape supply reel base 2. The stopper 15 meshes an indented wheel 16 integrally formed with the tape supply reel base 2.

Operation

The tape looseness preventive device constructed as above operates as follows.

FIG. 1 (Before the pressure contact of the head 3)

During the ejection mode, the head plate 4 is in such a retreated position that the head 3 thereon is away from the tape travelling path. Therefore, the slide plate 5 connected to the head plate 4 is also located in a retreated position as designated by an arrow A in the Figure and pulls the pivotal link 9 at the tip thereof to the axle of the tape supply reel base 2. Accordingly, the stopper 15 engages the indented wheel 16 to lock the tape supply reel base 2 unrotatable in the tape supply direction. The engagement between the stopper 15 and the indented wheel 16 in ensured because the pivotal link 9 is energized in the counterclock direction (arrow B direction) by the spring 14.

Subsequently, when a tape pack is halfway inserted in the tape player, the power source is turned on by actuating a takeup reel base drive motor M through a switch coupled to movement of the head plate 4. Accordingly, both the motor and the takeup reel base 1 linked to the motor concurrently start rotating. Thereafter, when the tape pack is fully inserted into the reproducing position in the tape player so that the reel shafts engage the reel shaft bores of the tape pack, the takeup reel in the tape pack receives rotational force from the takeup reel base 1 which already started rotating. However, since the tape supply reel base 2 is still locked by the pivotal link 9, the supply reel in the tape pack does not rotate. Therefore, the slack tape is taken up onto the takeup reel, and thereafter remains still. If the tape is not loose, the tape is not taken up onto the takeup reel at this stage.

Figure 2:
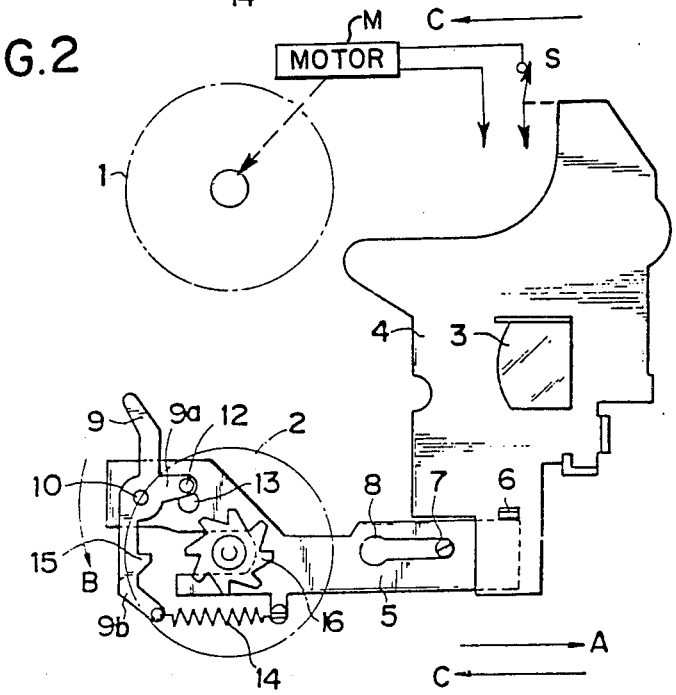
FIG. 2 is a plan view showing the state wherein the head fully advances to the position.

FIG. 2 (on and after the pressure contact of the head 3)

When the head 3 and the head plate 4 advance a give time later that the start of rotation of the takeup reel base 1, the slide plate 5 is pushed forward (in arrow C direction in the Figure) by the head plate 4. Then, the pivotal link 9 at the tip of the slide plate 5 moves away from the axle of the supply reel base 2 so that the stopper 15 of the pivotal link 15 disengages from the indented wheel 16 and permits the supply reel base 2 to rotate. As a result, the tape is drawn off the suppy reel by pinch rollers and capstans which forcibly sandwich the tape concurrently with the pressure contact of the head 3, and is wound up onto the takeup reel driven by the takeup reel base 1.

It is necessary to disengage the stopper 15 from the indented wheel 16 just upon completion of the pressure contact of the head 3. In this connection, the embodiment employs the projection 15 provided on the pivotal link 9 biased by the spring 14 so that the pivotal link 9 still moves toward the indented wheel 16 due to the biasing force of the spring 14 for a short time after the slide plate 5 moves away from the axle of the tape supply reel base 2, so as to maintain the engagement between the stopper 15 and the indented wheel 16 before the slide plate 5 fully moves and the pressure contact of the head 3 is completed.

If it is possible to design the stopper 15 and the indented wheel 16 so as to maintain their engagement over a sufficient length corresponding to the movement stroke of the slide plate 5, the stopper 15 may be provided directly on the slide plate 5, and the pivotal link 9 may be omitted, accordingly.

Other Embodiments

The invention is not restricted to the aforedescribed embodiment. The following modifications are also applicable.

(1) The stopper 15 and the indented wheel 16 may be replaced by a brake shoe-type stopper and a boss integrally formed on the supply reel base 2 for frictional contact with the brake shoe-type stopper to stop the rotation of the supply reel base 2.

(2) The stopper may be provided directly on the slide plate 5.

(3) The link may be replaced by another link which is connected to the head plate 4 and not to the slide plate 5 for movement to and away from a side face of the tape supply reel base 2 in response to the movement of the head plate 4 to and away from the tape path, said another link having the stopper at the tip thereof.

(4) The stopper may be provided directly on the head plate 4.

(5) If the tape player is designed so that the pinch rollers get in pressure contact with the capstans in response to the full advancement of the head 3, any of the above-mentioned braking mechanisms may be further provided to control the pressure contact of the pinch rollers with the capstans.

Effects of the Invention

According to the invention, before the head fully advances to the tape path, the takeup reel never wind up a tape thereonto after the slack part of the tape is removed or when the tape has no slack part because the tape supply reel base 2 is locked unrotatable. Therefore, it overcomes the problem that the tape is unrolled from the supply reel after the tape pack is inserted into the tape player but before the head 3 fully advances to the tape path. So, the invention never causes the signals on the starting part of the tape to fail to be reproduced.

It follows that the invention is superior to the conventional slack prevention device in preventing the tape from accumulating on the capstans or the pinch rollers before reaching the takeup reel.

Further, since the head 3 is brought into pressure contact with the tape which is stretched to the full between the locked supply reel base 2 and the driven takeup reel base 1, the head 3 can contact with the tape with a proper relation therebetween and immediately begin faithful and reliable reproduction.

We claim:

1. In a tape cassette player having a rotatable tape supply reel base including means for lockingly accepting a supply reel thereon, a rotatable takeup reel base including means for lockingly accepting a takeup reel thereon, a takeup reel base drive motor means for driving said take up reel base to wind a tape thereon from said supply reel, a magnetic reproducing head, head shift means for moving said head from a retracted position to allow cassette insertion to a forward tape-contacting position after such insertion, and means for automatically energizing said drive motor to urge said takeup reel base in a tape-advancing direction attendant to insertion of said cassette, the improvement comprising:

brake means for releasably locking said tape supply reel base against rotation caused by said urging of said takeup reel, said brake means including means responsive to the position of said head shift means for operating said brake means to a locking state when said head is in said retracted position and for operating said brake means to an unlocking state after movement of said head to a tape-contacting position, so that the tape is tensioned by said motor means and immobilized by said brake means prior to the release of said brake means.

2. The system as set forth in claim 1 wherein said brake means includes:

a movable slide plate operatively linked to said head shift means so as to be moved between advanced and retracted positions responsively corresponding to movement of said head between said tape-contacting and retracted positions thereof;

a stopper carried on said slide plate;

an indented wheel affixed to said tape supply reel base;

said stopper and said indented wheel being provided with portions configured for lockingly engaging each other with said slide plate in said retracted position and for disengaging upon movement of said slide plate during said movement of said head to said tape-contacting position.

3. The system as set forth in claim 2 wherein said slide plate carries a pivotal link thereon, said stopper being formed on said pivotal link.

4. The system as set forth in claim 3 wherein a spring means is provided coupled between said pivotal link and said slide plate for biasing said stopper toward a position for engagement with said indented wheel.

* * * * *